United States Patent [19]

Takeuchi

[11] Patent Number: 6,101,883
[45] Date of Patent: Aug. 15, 2000

[54] SEMICONDUCTOR PRESSURE SENSOR INCLUDING A RESISTIVE ELEMENT WHICH COMPENSATES FOR THE EFFECTS OF TEMPERATURE ON A REFERENCE VOLTAGE AND A PRESSURE SENSOR

[75] Inventor: Takanobu Takeuchi, Tokyo, Japan

[73] Assignee: Mitsubishi Denki Kabushiki Kaisha, Tokyo, Japan

[21] Appl. No.: 08/927,201

[22] Filed: Sep. 11, 1997

[30] Foreign Application Priority Data

Apr. 8, 1997 [JP] Japan .................................. 9-089279

[51] Int. Cl.[7] ................................ G01L 9/00; G01L 9/16
[52] U.S. Cl. ................................................ 73/754; 73/708
[58] Field of Search ........................... 73/708, 720, 721, 73/726, 727, 753, 754; 327/309, 310, 311, 509, 512

[56] References Cited

U.S. PATENT DOCUMENTS

| 5,335,549 | 8/1994 | Kato ........................................... 73/721 |
|---|---|---|
| 5,343,755 | 9/1994 | Huss ........................................... 73/708 |
| 5,544,529 | 8/1996 | Mitani et al. ............................... 73/754 |
| 5,684,428 | 11/1997 | Nomura et al. ........................... 327/509 |

FOREIGN PATENT DOCUMENTS 61-144883  7/1986  Japan .

*Primary Examiner*—William Oen

[57] ABSTRACT

A semiconductor pressure sensor includes a substrate with a semiconductor pressure detecting element mounted thereon. The pressure detecting element includes a pressure detector, having two terminals, which generates a small potential difference between the two terminals in proportion to a pressure applied to the pressure sensor, and a peripheral circuit for differential amplification of the small potential difference based on a reference voltage applied thereto. Reference voltage setting resistors are used to set the reference voltage to a predetermined value. Also, temperature compensating resistors compensate for an error produced in the pressure detector as a result of change in temperature and an error caused in the peripheral by a change of the reference voltage resulting from the change in temperature, respectively.

8 Claims, 1 Drawing Sheet

SEMICONDUCTOR PRESSURE SENSOR INCLUDING A RESISTIVE ELEMENT WHICH COMPENSATES FOR THE EFFECTS OF TEMPERATURE ON A REFERENCE VOLTAGE AND A PRESSURE SENSOR

BACKGROUND OF THE INVENTION

1. Field of the Invention

The present invention generally relates to a pressure sensor formed on a semiconductor substrate and, more particularly, to setting a reference voltage in a circuit peripheral to the pressure sensor on the semiconductor substrate.

2. Description of the Prior Art

A pressure sensor formed on a semiconductor substrate generally includes a pressure detecting circuit and a peripheral circuit which compensates for a temperature-dependent change to thereby adjust an output characteristic. This peripheral circuit must extremely faithfully amplify a microvoltage generated from the pressure detecting circuit as a function of the magnitude of a pressure applied to the pressure sensor. Accordingly, the peripheral circuit generally includes a differential amplifier which may be in the form of, for example, an operational amplifier. In the pressure sensor formed on a semiconductor substrate, the pressure detecting circuit, and a portion of the peripheral circuit such as the operational amplifier, are integrated together on the semiconductor substrate.

Accordingly, when input terminals of the operational amplifier and/or a source of a reference voltage required for differential amplification are to be formed outside an integrated circuit board which includes the pressure detecting circuit and that portion of the peripheral circuit, the reference voltage is generally divided by two resistors connected in series between a power source and ground.

As is well known to those skilled in the art, when the resistors used to set the reference voltage have difficult respective temperature coefficients, the reference voltage will be undesirably affected by, and hence vary, depending on the temperature. Because the pressure sensor formed on the semiconductor substrate, or the semiconductor pressure sensor as referred to hereinafter, requires a pressure signal to be amplified some tens to 200 times by the peripheral circuit, this temperature-dependent change of the reference voltage will be correspondingly amplified, resulting in a detection error in the output of the semiconductor pressure sensor.

SUMMARY OF THE INVENTION

Accordingly, the present invention has been developed to substantially eliminate the above discussed problem and is intended to provide an improved semiconductor pressure sensor wherein a detection error occurring in the peripheral circuit, and resulting from variation of the reference voltage, is converted into a detection error in the pressure detector to thereby minimize the detection error.

In order to accomplish this object, the present invention provides a semiconductor pressure sensor that comprises a substrate having mounted thereon a semiconductor pressure detecting element having a pressure detector, with two terminals, for generating between the two terminals a minute potential difference proportional to a pressure applied to the pressure sensor, and a peripheral circuit for accomplishing a differential amplification of the minute potential difference based on a reference voltage applied thereto. The pressure sensor also comprises a reference voltage setting resistance means for setting the reference voltage to a predetermined value, and a temperature compensating resistance means for compensating for an error produced in the pressure detector as a result of change in temperature and, also, an error brought about in the peripheral circuit by a change of the reference voltage resulting from the change in temperature.

The present invention also provides a semiconductor pressure sensor which comprises a substrate; a semiconductor pressure detecting element mounted on the substrate and including a pressure detector having two terminals and capable of generating between the two terminals a minute potential difference proportional to a pressure applied to the pressure sensor, and a peripheral circuit for accomplishing a differential amplification of the minute potential difference based on a reference voltage applied thereto; and at least one pair of reference voltage setting resistors connected in series with each other between a power source and a ground for setting the reference voltage to a predetermined value. The reference voltage setting resistors are respective resistors selected from the same lot of resistors manufactured.

Preferably, the reference voltage setting resistors are formed on the same substrate by using the same of resistance material.

BRIEF DESCRIPTION OF THE DRAWINGS

The present invention will become readily understood from the following description of a preferred embodiment thereof made with reference to FIG. 1 which illustrates a circuit diagram of a semiconductor pressure sensor of the present invention.

DETAILED DESCRIPTION OF THE EMBODIMENTS

Figure 1:
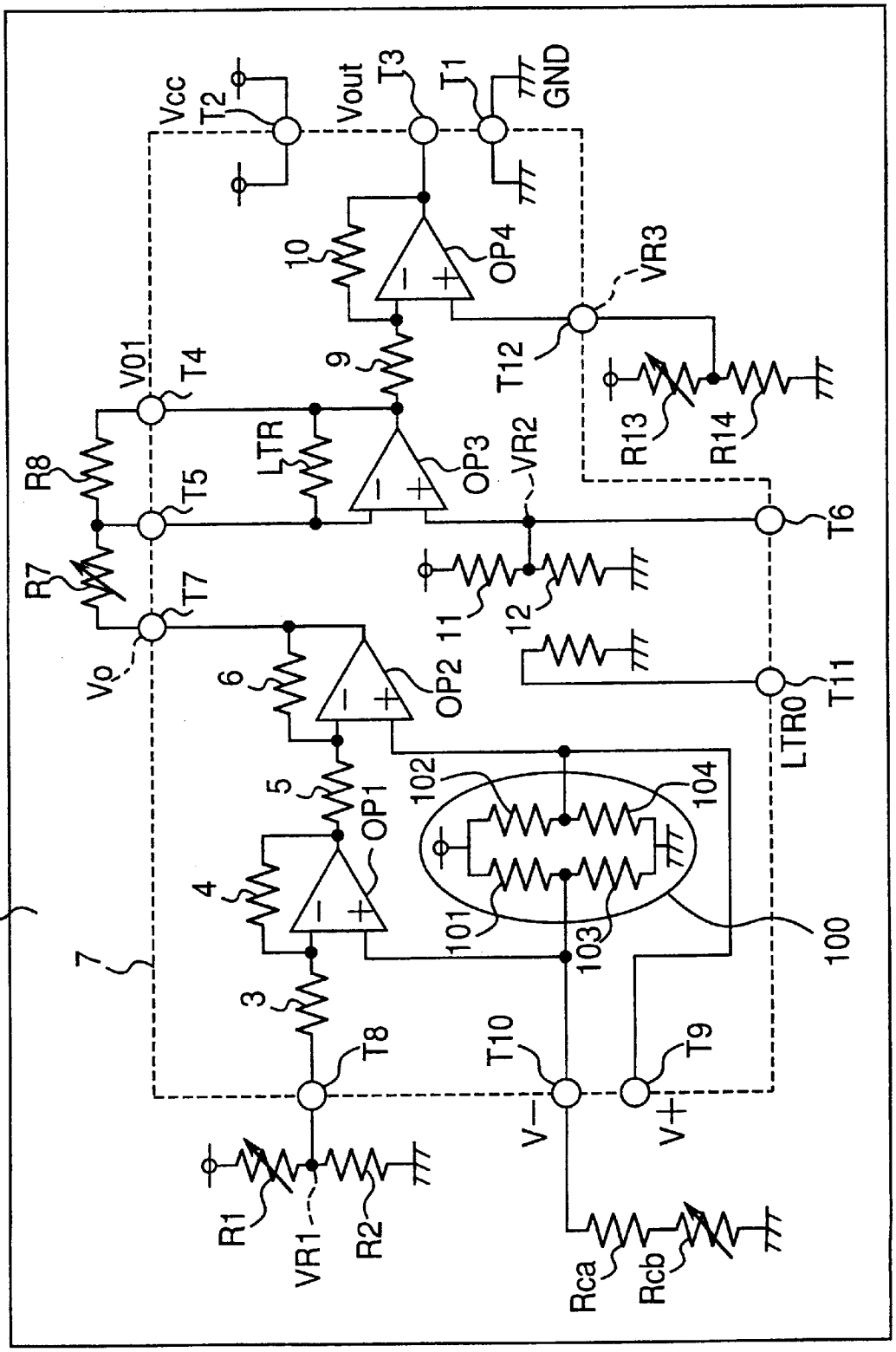

Referring to the sole accompanying drawing, a semiconductor pressure sensor in accordance with the present invention comprises a substrate 20, which may be a printed circuit board made of ceramics or any other suitable material and which has electrodes and circuit wirings printed thereon, and a semiconductor IC chip 7 firmly mounted on the circuit board 20. The semiconductor IC chip 7 includes operational amplifiers OP1, OP2, OP3 and OP4, resistors 3, 4, 5, 6, 9, 10, 11 and 12, and a pressure detector 100 which is in the form of a bridge circuit including piezoelectric resistors 101, 102, 103 and 104.

A portion of the printed circuit board 20 outside the portion occupied by the semiconductor IC chip 7 is formed with first reference voltage setting resistors R1 and R2 for providing the operational amplifier OP1 with a reference voltage VR1, second reference voltage setting resistors R13 and R14 for providing the operational amplifier OP4 with a reference voltage VR3, temperature compensating resistors Rca and Rcb which form a peripheral circuit for the pressure detector 100 and compensate for an error resulting from change in temperature, a sensitivity adjusting resistor R7 and a sensitivity correcting resistor R8.

The operational amplifiers OP1 and OP2 and resistors 3 to 6 together constitute a differential amplifier. The resistors 3 and 6 have respective resistances r3 and r6, which are equal to each other, and the resistors 4 and 5 have respective resistances r4 and r5 which are also equal to each other. Accordingly, the differential amplifier has a gain $G_{OP12}$ expressed by (r6/r5+1). The operational amplifier OP3 forms an inverting amplifier having a gain $G_{OP3}$ expressed by $(r8 \cdot r_{LTR})/[(r8+r_{LTR}) \cdot r7]$, r7, r8 and $r_{LTR}$ represent resistances of the resistors R7, R8 and LTR, respectively. Similarly, the operational amplifier OP4 forms an inverting amplifier having a gain $G_{OP4}$ expressed by (r10/r9) wherein r9 and r10 represent resistances of the resistors R9 and R10, respectively.

The pressure detector 100 is in the form of the bridge circuit comprised of the piezoelectric resistors 101 to 104 each formed by a diffusion resistance. These resistors 101 to 104 have their respective resistances chosen so that when no pressure is applied, respective voltages V− and V+ at terminals T10 and T9 will be Vcc/2, wherein Vcc represents a power source voltage. But when a rated pressure is applied, a potential difference of some tens of a millivolt to one hundred and some tens of a millivolt will be developed between the terminals T10 and T9. With the semiconductor pressure sensor in the illustrated embodiment, the potential difference developed by the pressure detector 100 is amplified by and outputted from the operational amplifiers OP1 to OP4. By suitably setting the resistance $r_{R7}$ of the sensitivity adjusting resistor R7 to a predetermined value, the sensitivity of the pressure sensor can be set to a predetermined value.

It has, however, been found that the semiconductor pressure sensor as actually manufactured tends to give rise to a potential difference (or an offset voltage) between the respective voltages V− and V+ at the terminals T10 and T9 even though no pressure is applied, because of variation in resistance during the manufacture of the resistors. This offset voltage is generally not higher than some tens of millivoltage and, so far as variation of this offset voltage is concerned, the resistance $r_{R1}$ of the reference voltage setting resistor R1 has to be adjusted to adjust the reference voltage VR1 to be supplied to the operational amplifier OP1 so that respective potentials at terminals T5 and T7 can become equal to each other. By so doing, during an offset condition (that is, so long as no pressure is applied), no electric current flows through the sensitivity adjusting resistor R7 and, therefore, any possible interference between the offset voltage and the output sensitivity can advantageously be avoided. Thus, without the offset voltage being changed, the output sensitivity can be adjusted. Once this has been done, the reference voltage setting resistor R13 has to be so adjusted as to render an output value to match with a designated value.

In the illustrated embodiment, the temperature compensating resistors Rca and Rcb function as a resistor for compensating for temperature-dependent change in offset voltage so that even though temperature changes while no pressure is applied, the offset voltage can be maintained at a predetermined value. In other words, respective resistances $r_{ca}$ and $r_{cb}$ of the temperature compensating resistors Rca and Rcb and their temperature coefficients are chosen on the basis of a temperature coefficient of the potential difference between the voltages V− and V+ of the pressure detector 1. Specifically, in the illustrated embodiment, the respective resistances $r_{ca}$ and $r_{cb}$ of the temperature compensating resistors Rca and Rcb and their temperature coefficients are chosen by first determining a temperature-dependent change ΔVR1 of the reference voltage VR1 and a temperature-dependent change ΔVR3 of the reference voltage VR3, then converting the temperature-dependent changes ΔVR1 and ΔVR3 into corresponding temperature coefficients of the potential difference between the voltages V− and V+ of the pressure detector 100 by the use of the following equations (1) and (2), and finally calculating a total temperature coefficient which is obtained by adding a temperature coefficient of only the pressure detector 100 to the temperature coefficients so converted:

$$K1 = \Delta VR1/G_{OP12} \quad (1)$$

$$K2 = (G_{OP4}+1) \times \Delta VR3/(G_{OP12} \times G_{OP3} \times G_{OP4}) \quad (2)$$

wherein K1 represents the change ΔVR1 which has been converted into a drift value of the pressure detector 100; K2 represents the change ΔVR3 which has been converted into a drift value of the pressure detector 100; $G_{OP12}$ represents the gain of the differential amplifier comprised of the operational amplifiers OP1 and OP2; and $G_{OP3}$ and $G_{OP4}$ represent respective gains of the operational amplifiers OP3 and OP4.

Thus, the illustrated embodiment of the present invention is such that both compensation for a temperature-dependent change of the potential difference produced in the pressure detector 100 and compensation for the respective changes ΔVR1 and ΔVR3 are accomplished by the use of the resistors Rca and Rcb. As discussed above, since any possible error which would be brought about by temperature-dependent change in the pressure detector 1 and also any possible error which would be brought about by temperature-dependent change in the peripheral circuit can be compensated for satisfactorily, the present invention effectively provides a semiconductor pressure sensor which involves an extremely minimized error.

It is to be noted that the resistors R1 and R2 may be selected from the same lot of manufactured resistors and the resistors R13 and R14 are similarly selected from the same lot of resistors manufactured. In any event, each of those resistors R1, R2, R13 and R14 is preferably in the form of either a thick-film resistance chip or a thin-film resistance chip. In such case, the resistor R1 may be a trimming resistance chip and the resistor R2 may be either a standard resistance chip or a trimming resistance chip.

By selecting the resistors R1 and R2 from the same lot of resistors resistors and the manufactured R13 and R14 from the same lot of manufactured, the resistors R1 and R2 can have the same temperature coefficients and the resistors R13 and R14 can similarly have the same temperature coefficients. Therefore, the temperature-dependent change of each of the reference voltages can advantageously be minimized to thereby minimize the possibility of an error in the peripheral circuit.

Alternatively, the resistors R1 and R2 may be thick-film resistors formed on the same substrate by using the same lot of resistance material (for example, the same resistance paste) and, similarly, the resistors R13 and R14 may be thick-film resistors formed on the same substrate by using the same lot of resistance material. According to this alternative embodiment of the present invention, since the resistors R1 and R2 can have the same temperature coefficients and the resistors R13 and R14 can similarly have the same temperature coefficients, the temperature-dependent change of each of the reference voltages can be minimized to thereby minimize the possibility of occurrence of an error in the peripheral circuit.

Although the present invention has been described in connection with the preferred embodiments thereof, it should be noted that various changes and modifications are apparent to those skilled in the art. Accordingly, such changes and modifications so far as encompassed by the appended claims are to be understood as included within the scope of the present invention.

What is claimed is:

1. A semiconductor pressure sensor which comprises:
   a substrate;
   a semiconductor pressure detecting element mounted on said substrate and including a pressure detector, said pressure detector generating a potential difference proportional to an applied pressure, and a peripheral circuit for amplifying the potential difference generated by said pressure detector based on a reference voltage applied thereto;

a reference voltage setting resistance means for setting the reference voltage to a predetermined value; and a temperature compensating resistance means for directly compensating for an error produced in the pressure detector as a result of a temperature change, and for indirectly compensating for an error caused in the peripheral circuit by a change of the reference voltage resulting from the change in temperature, said temperature compensating resistance means being set to adjust the potential difference generated by said pressure detector based on both a temperature coefficient of said pressure detector and temperature characteristics of said reference voltage.

2. The semiconductor pressure sensor of claim 1, wherein said pressure detector generates a potential difference between two terminals in proportion to applied pressure, and said temperature compensating resistance means is electrically connected to one of said two terminals.

3. The semiconductor pressure sensor of claim 1, wherein said temperature compensating resistance means has a temperature coefficient which is set as a function of temperature-dependent characteristics of said reference voltage and said pressure detector.

4. The semiconductor pressure sensor of claim 1, further comprising a second reference voltage resistance means for generating a second reference voltage, wherein said temperature compensating resistance means further indirectly compensates for an error caused in the peripheral circuit by a change in the second reference voltage resulting from the change in temperature.

5. The semiconductor pressure sensor of claim 1, wherein said semiconductor pressure detecting element is configured as an integrated circuit mounted on said substrate, and said reference voltage setting resistance means and said temperature compensating means are mounted on said substrate external to said integrated circuit.

6. The semiconductor pressure sensor of claim 1, wherein said reference voltage setting resistance means includes at least one pair of reference voltage setting resistors connected in series with other between a power source and ground.

7. The semiconductor pressure sensor of claim 6, wherein said at least on pair of reference setting resistors are selected from the same lot of manufactured resistors.

8. The semiconductor pressure sensor of claim 6, wherein said at least on pair of reference voltage setting resistors are formed on said substrate using the same resistance material.

* * * * *